Patented Oct. 6, 1925.

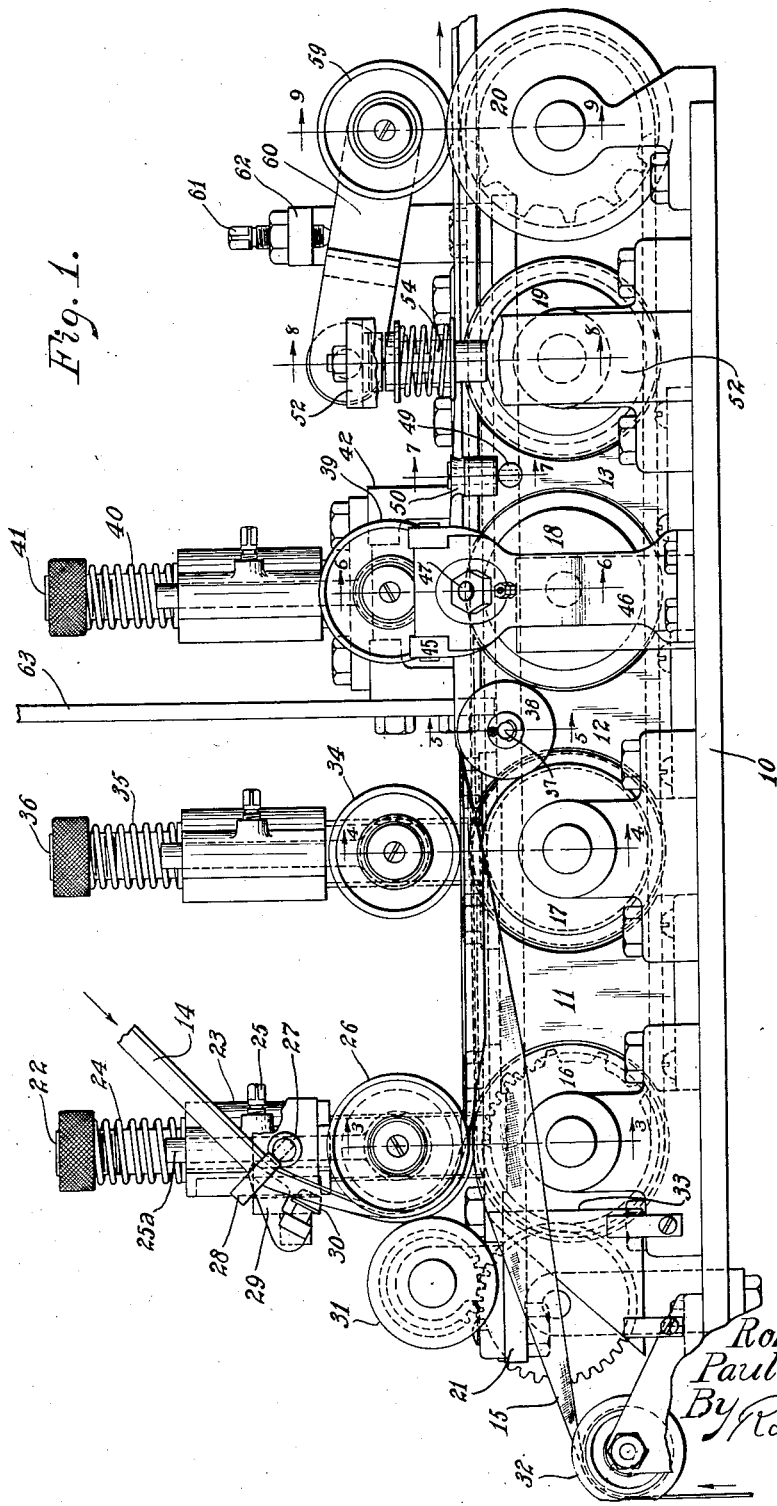

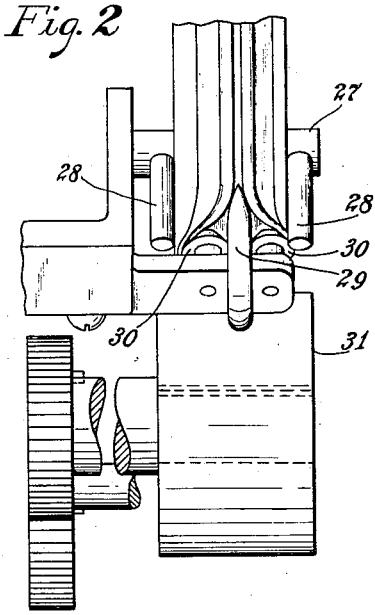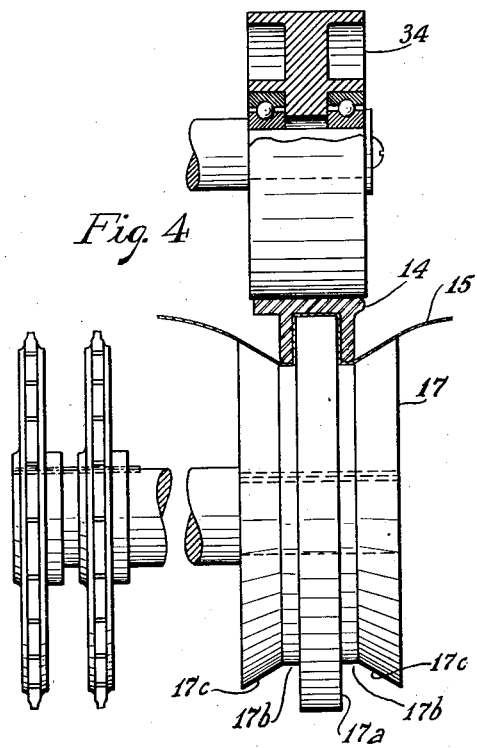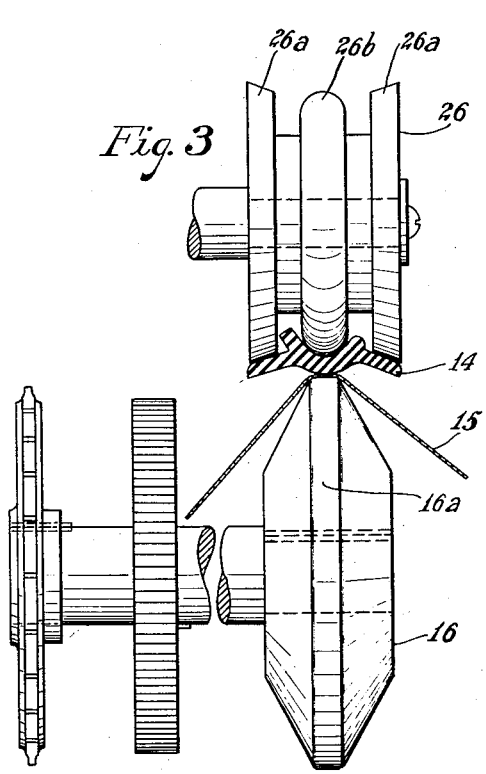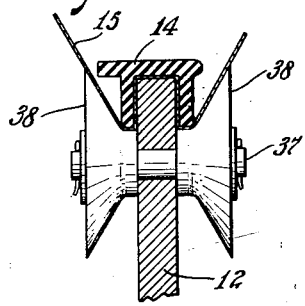

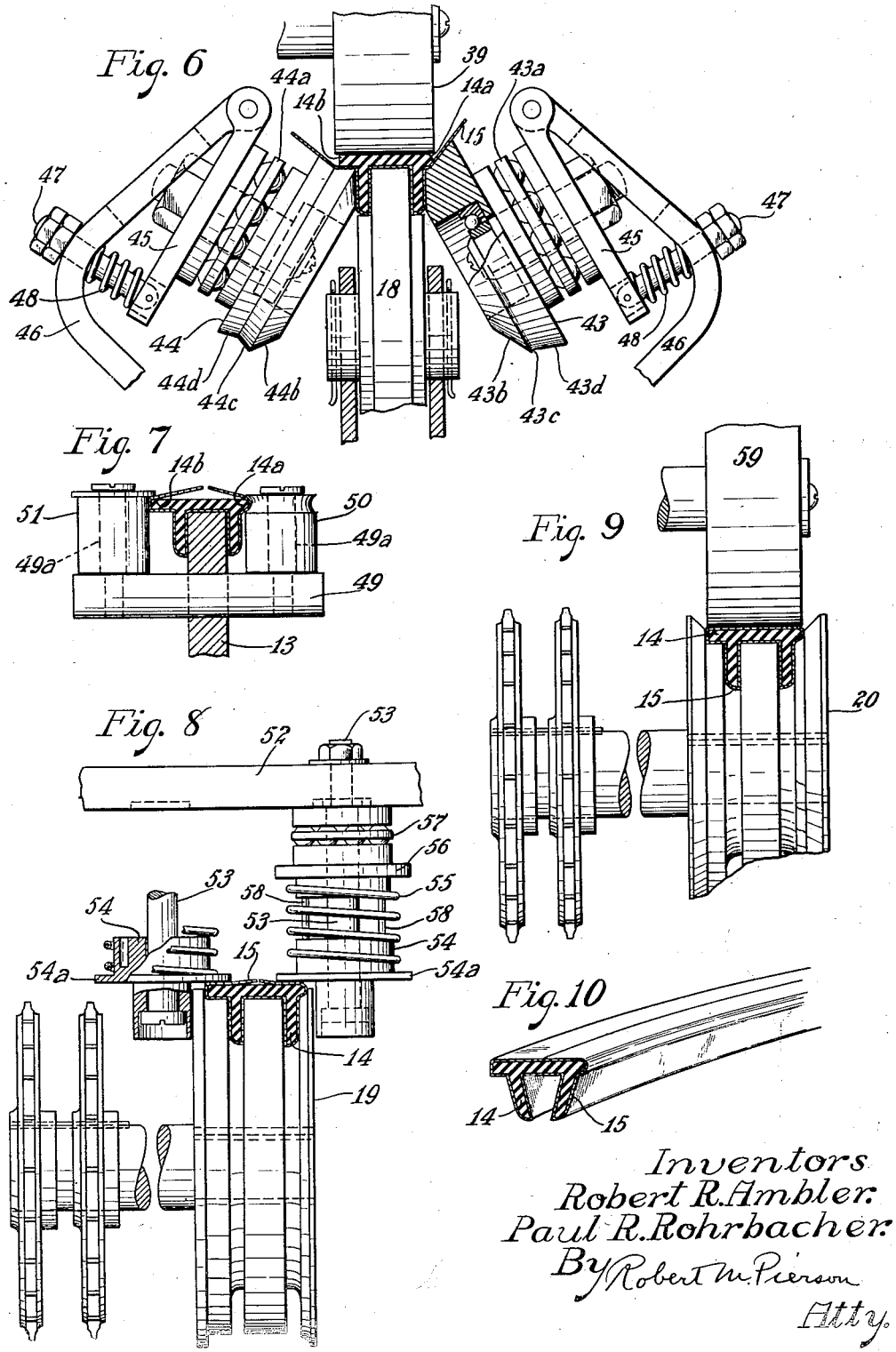

1,555,816

UNITED STATES PATENT OFFICE.

ROBERT R. AMBLER AND PAUL R. ROHRBACHER, OF AKRON, OHIO, ASSIGNORS TO THE B. F. GOODRICH COMPANY, OF NEW YORK, N. Y., A CORPORATION OF NEW YORK.

METHOD AND MACHINE FOR COVERING STRIP MATERIAL.

Application filed July 7, 1922. Serial No. 573,442.

*To all whom it may concern:*

Be it known that we, ROBERT R. AMBLER and PAUL R. ROHRBACHER, citizens of the United States, residing at Akron, in the county of Summit and State of Ohio, have invented a certain new and useful Method and Machine for Covering Strip Material, of which the following is a specification.

This invention relates to the art of progressively applying a covering, such as a fabric cover, to continuous lengths of strip material. We are aware that methods and machines have heretofore been devised for progressively applying covers longitudinally to strip material of triangular or other simple cross-sectional form such as unvulcanized tire bead strips, but such devices, so far as we are aware, are not adapted to cover longitudinally channeled strip material or vulcanized rubber strip material generally.

An especially important application of our invention is in the art of applying a strip of fabric as a cover to strips of vulcanized channel rubber such as is used for the mounting of glass windows in automobile bodies, where the channel rubber, which may be covered both within its channel and on its exterior with anti-friction or decorative fabric, is fastened to the window frame and serves as a guideway for the glass of the window, the edge of which is slidably mounted in the channel of the rubber strip.

As the rubber under-body of the strip requires to be in a tacky or sticky condition, such as may be produced by the application of a rubber cement, and the inner face of the fabric may likewise be rendered sticky, in order that the cover will adhere to the strip, they are disposed to stick together wherever they first come into contact, and a difficult operation is presented in fitting the cover snugly within, or within and about the channeled strip, without wrinkles or excessive local tension in the fabric cover.

Our general object is to provide an improved method and an improved strip-covering machine, adapted progressively to apply a cover longitudinally to a strip, more particularly a channeled strip, of material such as vulcanized rubber, and more especially a cover adapted to adhere to the strip as it is applied. Economy of time and labor, and an improved product, are also included in our object.

Of the accompanying drawings:

Fig. 1 is a side elevation of a machine embodying and adapted to carry out our invention in its preferred form.

Fig. 2 is a plan view of certain parts of the same, at the work-receiving end of the machine.

Fig. 3 is a section on line 3—3 of Fig. 1.
Fig. 4 is a section on line 4—4 of Fig. 1.
Fig. 5 is a section on line 5—5 of Fig. 1.
Fig. 6 is a section on line 6—6 of Fig. 1.
Fig. 7 is a section on line 7—7 of Fig. 1.
Fig. 8 is a section on line 8—8 of Fig. 1.
Fig. 9 is a section on line 9—9 of Fig. 1.
Fig. 10 is a sectional perspective view of the finished product.

Referring to the drawings, 10 is a bed plate upon which are mounted an aligned series of vertical plates or guide-shoes 11, 12, 13 formed at their horizontal upper edges to fit within the channel of a strip of channel rubber 14 to which is to be applied a cover-strip of material, 15, which latter may be of velvet, felt, or other material.

The shoes 11, 12, 13 are cut away arcuately at their fore and aft edges to accommodate the adjacent members of a horizontal series of work-supporting and driving rollers 16, 17, 18, 19, 20, of respective forms hereinafter described, secured upon respective shafts journaled in suitable bearing members mounted upon the plate 10, and said work-supporting rollers, except the roller 18, are adapted to be driven at substantially the same peripheral speed, clockwise as viewed in Fig. 1, as by a series of sprockets and chains or other suitable means, of which a detailed description is not believed to be necessary herein. The work-supporting rollers preferably extend a little higher than the upper edges of the shoes 11, 12, 13, so that the work rides upon the rollers rather than the shoes, the latter being designed more particularly to hold the legs of the channeled strip 14 apart.

Along the far side of the work-supporting rollers is supported, by suitable means mounted upon the bed plate 10, a horizontal plate 21, from which rises, at the work-receiving end of the machine, a spring-post 22, and slidably keyed upon the latter is a bracket-member 23 (Fig. 1) urged downward by a spring 24 on said post. Adjustably secured, by a set screw 25, in a vertical bore in said bracket member is a bar 25ª provided at its lower end with a horizontal axle upon which is loosely journaled a roller 26, of special form, directly over the driven work-supporting roller 16 and adapted to press the work against the latter.

We have found that in order smoothly and snugly to apply the cover 15 to the channeled, vulcanized rubber strip 14 (or any analogous strip), it is desirable to attach it first in the bottom of the channel only, which may best be done by progressively spreading apart the legs of the channeled strip, said legs being here shown as normally converging toward their outer edges, and that in so spreading and holding said legs and accurately guiding the strip it is advantageous to guide the strip so that it will pass partly around the roller 26 with its back against the latter, so that the longitudinal flexing of the strip about said roller will, through putting its legs, especially at their outer edges, under tension, cause them to gape farther apart after they have been somewhat spread by other means as they pass toward said roller. For so guiding the strip 14 that it will pass partly around the roller 26 as stated, and for initially spreading its legs apart, we provide a horizontal pin 27 (Figs. 1 and 2), projecting from a part of the bracket-member 23, over which the strip may slide upon its back, a pair of pins 28, 28 projecting laterally from the pin 27 and adapted to act as side-guides for the strip, a plow 29 mounted upon an extension from the bracket-member 23, said plow extending between the pins 28 and adapted to initiate the spreading of the strip's legs, and a pair of rollers 30, 30, here shown as being frusto-conical, loosely journaled upon said extension, and adapted further to spread the channeled strip as the latter is drawn past them.

If the cover 15 were attached to the elastic strip 14 with the latter under substantial tension, such as would result if the strip were pulled past the spreading and guiding members just described solely by a force applied to said strip at or beyond the point where the cover is presented to it, the subsequent contraction of the strip within the cover might destroy the smooth, snug fit of the latter. On this account it is preferable that the strip be under relative longitudinal compression, or less stretched than the covering strip, at the point where the cover is progressively presented to it. With this in view we provide a cylindrical roller 31 (Figs. 1 and 2) supported by the plate 21 and journaled in position to have the flattened strip 14 pressed against it by the roller 26 at a substantial distance from the point where said strip meets the cover strip 15. By suitable gears the roller 31 is adapted to be driven at a slightly greater peripheral speed than the work supporting rollers 16, 17, etc., so that it exerts a forward push on the strip without, however, buckling or piling up said strip in front of the cover-contacting point, since the roller tends to slip on the cemented surface of the strip 14 in overcoming the drag caused by the members 27, 28 and 29. We find that this aids in feeding the flattened, channeled strip 14 to the cover-contacting point without such tension as would result in buckling or wrinkling of the cover after it is applied, upon the contraction of the strip 14.

32 is a flanged guide roller for the cover strip 15, positioned somewhat below the line of feed of the strip 14, and between said guide roller and the work-supporting roller 16 we provide a cover-stretching member 33 (Fig. 1), arched over a part of the work-supporting roller 16, so that its upper portion is near the meeting point of the cover-strip and the channeled strip, said upper portion being adapted temporarily to stretch longitudinally, or laterally flex the middle part of the cover strip and impart a troughed form thereto as the latter is drawn over it, to present said middle part only to the channel strip, while the side margins of the cover strip take a lower and more direct course past the sides of the roller 16, and are held out of contact with the latter by the side portions of the member 33, over which they may slide.

The work supporting roller 16 (Fig. 3) is formed with a narrow, cylindrical tread 16ª, from which it is beveled off sharply to clear the side margins of the cover-strip, said tread being adapted to support the middle portion only of the cover strip against the pressure of the roller 26 upon the flattened channel strip 14. The presser roller 26 is preferably so formed as to bear against the upper side of the spread channel-strip's legs as well as against its middle portion, being provided, for the particular type of channel strip here shown, with beveled side flanges 26ª, 26ª for said legs, and an intermediate or central flange or tread 26ᵇ, of rounded contour, fitting the concavely curved back of the channel strip, so as to positively press the middle part of said strip, which naturally bows downward from the lateral flexing of the strip. The rollers 26 and 16 are thus adapted to join the strip and its cover along their middle lines only as they are fed between said rollers.

The guide-shoe 11 is adapted to hold the normally convergent legs of the channel strip substantially parallel as the strip passes thereover to the next work-supporting roller, 17. The latter is formed with a central flange 17ª having a cylindrical tread adapted to press the cover strip 15 entirely across the channel-bottom of the strip 14 and into the adjacent corners, and parallel sides adapted to fit said cover strip against the inner surfaces of the channel strip's legs, a cylindrical presser roller 34 being provided for pressing the work upon said flange. The channel of the rubber strip 14 is thus lined with the cover strip 15, and the action of the rollers 43, 44 subsequently described presses the sides of the channel against this lining to perfect the adhesion and complete the lining operation, regardless of whether the covering is continued around the rest of the channel strip with a wide cover-strip as here shown. The roller 17 is also provided with a narrow cylindrical surface 17$^b$ immediately at each side of said flange, adapted to fold this particular cover strip laterally and press it against the edges of the channel strip's legs, and with a beveled flange 17$^c$ adjacent each of said surfaces for initiating the upward folding of the side margins of the cover strip toward the outer surfaces of said legs. The presser roller 34 is loosely journaled and is mounted in substantially the same manner as the roller 26, above described, being backed by a spring 35 upon a spring-post 36.

Mounted in a transverse aperture in the next guide shoe, 12, is an axle 37 (Fig. 5), upon each end portion of which is loosely journaled a roller 38 having, adjacent said shoe, a cylindrical portion adapted to underlie the work at the edge of the latter's leg, and a working surface flared outwardly therefrom and adapted to bend the side margin of the cover strip farther toward the channel strip.

The next work-supporting roller, 18, is loosely journaled and is so formed as to support the work by contact with both the floor of the latter's channel and the edges of its legs, as is shown clearly in Fig. 6, a loosely journaled, cylindrical presser roller 39, bearing upon the back of the channel strip, being provided for holding the work against said roller 18. This presser roller, 39, is mounted in substantially the same manner as the rollers 26 and 34, being backed by a spring 40 upon a spring-post 41, but said spring-post is mounted upon an arched structure 42, the latter being so formed in order to accommodate one of a pair of side-pressing rollers, 43, 44. Said side-pressing rollers are loosely journaled on inclined axes, are provided with thrust bearing 43$^a$, 44$^a$, and are formed with beveled working faces 43$^b$, 44$^b$ adapted to press the cover against the respective legs of the channel strip 14, with working faces 43$^c$, 44$^c$ adjacent thereto adapted to press said cover against the under sides of base flanges 14$^a$, 14$^b$ with which the particular channel strip here shown is formed, and with faces 43$^d$, 44$^d$, adapted to bend the margins of the cover upward about said base flanges. Said rollers are mounted upon respective plates 45, 45, pivoted upon brackets 46, 46 rising from the bed plate 10. Pivoted to the swinging end of each of said plates is a spring post 47 loosely and slidably mounted in an aperture through the adjacent bracket 46, and 48 is a compression spring on said post, between the bracket and the plate, adapted to urge the roller against the work.

Secured in the next guide-shoe, 13, is a transverse bar 49, from each end of which rises a vertical axle-post 49$^a$, 49$^a$ (Fig. 7). On each of said axle-posts is loosely journaled a small roller, 50, 51, so formed as to fit the cover about the adjacent base flange 14$^a$ or 14$^b$ and bend the side margins of the cover over toward the outer base-surface of the channel strip.

The working surface of the next work-supporting roller, 19, is so formed as to contact substantially all parts of the work except its outer base-surface, as is shown clearly in Fig. 8. An arch 52 mounted on the base-plate 10 straddles said roller 19, and an axle 53 projects downward from said arch at each side of said roller. Loosely journaled on each of said axles is a roller 54 having a radial flange 54$^a$ with a substantially horizontal, plane working face adapted to wipe the margins of the cover toward the middle line of the channel strip's back, the axle posts 53 preferably being tilted slightly in the direction of movement of the work at their lower ends, so that each part of the flange 54$^a$ will press the work harder as it moves thereonto than it does as it recedes therefrom,—which is to say, the work will be pressed harder by the on-running than by the off-running part of the roller. For pressing the roller 54 downward against the work a compression spring 55 is interposed between said roller and a flanged collar 56 journaled on the axle post 53 and provided with a thrust bearing 57. 58, 58 are dowel pins interposed between said roller and said collar to hold them in steady relation and compel them to rotate together while permitting the spring to act against the roller; thus avoiding irregularities in the pressure or movement of the latter.

The last work-supporting roller, 20, is formed to fit the contour of the work, except the outer base-surface of the latter, and a cylindrical presser roller 59 thereover, loosely journaled at the end of a pivoted arm 60, is adapted finally to press the margins of the cover strip against the back of the channel strip. A set screw 61, mounted in an overhanging bracket 62 rising from the plate 21 is adapted to bear against the arm 60 to hold the presser roller 59 against the work. 63 is a standard rising above the machine and adapted to serve as a mounting for a guide roller (not shown) for the channel strip 14 as the latter passes to the spreading devices 29, 30. Additional guiding and tensioning devices adapted to control the channel strip and the cover strip as they are drawn from their respective sources of supply, if desired or found necessary, may be added to the machine as here shown.

The operation of the machine is believed to be obvious from the foregoing description.

Channel strips, including strips of such special sectional form as is here shown, may be rapidly and smoothly covered, and as the cover is applied while the elastic channel strip, in the case of a rubber or similar strip, is under relative compression or less stretched than the covering strip, the cover is not buckled by subsequent contraction of the underlying rubber. By first flattening or spreading the legs of the channel strips, the cover may be conveniently applied first along the middle part of the channel's floor, and then in successive steps laterally about the rest of the channel strip.

Modifications may be resorted to without departing from the scope of our invention, and we do not wholly limit our claims to the particular embodiment or the exact mode of procedure here shown and described. It is especially to be understood that we are not broadly limited to the use of the entire number of instrumentalities here shown and do not intend wholly to restrict our invention to the application of a cover completely enclosing a channel or other strip, or otherwise restrict it except as set forth in our claims.

We claim:

1. The method of covering elastic strip material which comprises applying a covering strip adhesively to said strip material while maintaining such relative longitudinal stresses in the two as to result in a longitudinal compression in said strip material, balanced against tension of the covering strip, in the resulting structure.

2. The method of covering elastic strip material which comprises longitudinally feeding said material and a covering strip therefor into contact with each other, one or the other being provided with an adhesive surface, adhesively pressing them together, and maintaining such relative longitudinal stresses in the two as they pass their initial contacting point as to produce a balance, in the finished work, of longitudinal compression in the strip material against longitudinal tension in the covering strip.

3. The method of adhesively applying a covering strip to a channel strip which comprises feeding said channel strip and said covering strip longitudinally into contact with each other so that the middle portion of said covering strip and the floor of the channel of said channel strip are the first parts of said strips to contact each other, and progressively wrapping and pressing said covering strip in successive steps laterally about said channel strip in opposite directions from the floor of said channel.

4. The method of adhesively applying a covering strip to a channel strip which comprises longitudinally feeding said channel strip, progressively opening the channel thereof as it is so fed, and progressively applying a covering strip to an inner wall of said channel strip while its channel is so opened.

5. The method of adhesively applying a covering strip to a channel strip which comprises longitudinally feeding said channel strip, progressively flexing the same longitudinally as it is so fed in a manner to cause its channel to open, and progressively applying the covering strip to said channel strip.

6. The method of adhesively applying a covering strip to a channel strip which comprises progressively opening the channel of said strip, progressively attaching a covering strip along its middle portion to the floor of said channel, allowing said channel strip progressively to close toward its normal cross-sectional form, and progressively pressing said covering strip against the floor and side walls of said channel.

7. The method of adhesively applying a covering strip to a channel strip which comprises opening the channel of said strip, applying the covering strip to the interior of said channel while the latter is so opened, permitting said channel strip to close toward its normal cross-sectional form, and thereafter folding and pressing said covering strip laterally about the exterior of said channel strip.

8. The method of adhesively applying a covering strip to a channel strip which comprises progressively opening the channel of said strip, progressively compressing said strip longitudinally relatively to the covering strip, and progressively applying the covering strip to said channel strip while the latter is so opened and relatively compressed.

9. The method of adhesively applying a covering strip to a channel strip which comprises progressively flexing said channel strip longitudinally in a manner to cause its channel to open, progressively compressing said strip relatively to the covering strip in a longitudinal direction, and progressively applying the covering strip thereto while said channel strip is so relatively compressed and its channel opened.

10. Apparatus for covering elastic strip material, said apparatus comprising means for placing said material under longitudinal compression relatively to the cover, and means for applying a cover adhesively thereto while it is so held under compression.

11. Apparatus for covering elastic strip material, said apparatus comprising means for feeding said material, means for guiding a covering strip into contact with said strip material as the latter is so fed and pressing it against the same, and means for maintaining the strip material and the covering strip under such relative conditions of longitudinal stress as they pass into contact with each other as to provide a balance of longitudinal compression in the strip material against longitudinal tension in the covering strip, in the product.

12. Apparatus for applying a covering strip to a channel strip, said apparatus comprising means for longitudinally feeding said channel strip, means for so guiding a covering strip that its middle portion first contacts said channel strip along a channel surface of the latter, and means for wrapping said covering strip laterally, in opposite directions from the initial line of contact, about said channel strip.

13. Apparatus for applying a covering strip to a channel strip, said apparatus comprising means for progressively opening the channel of said channel strip, and means for progressively applying a cover strip to an inner wall of said channel while the latter is so opened.

14. Apparatus for applying a covering strip to a channel strip, said apparatus comprising means for progressively flexing said channel strip longitudinally in a manner to cause its channel to open, and means for progressively applying a covering strip to the inner surface of said channel strip while its channel is so opened.

15. Apparatus for applying a covering strip to a channel strip, said apparatus comprising means for progressively opening the channel of said channel strip, means for attaching a covering strip along its middle portion to the floor of said channel, and a member, having substantially the normal cross-sectional form of said channel, adapted to run in said channel to press said covering strip against the interior walls of said channel.

16. Apparatus for applying a covering strip to a channel strip, said apparatus comprising means for opening the channel of said strip, means for attaching a covering strip to an inner wall of said opened channel strip, means adapted to fit within said channel strip when it has closed toward its normal cross-sectional form, and means for folding and pressing said covering strip laterally about the exterior of said channel strip.

17. Apparatus for applying a covering strip to a channel strip, said apparatus comprising means for progressively opening the channel of said strip, means for progressively compressing said strip longitudinally relatively to the covering strip, and means for progressively applying a covering strip to said channel strip while it is so opened and relatively compressed.

18. Apparatus for applying a covering strip to a channel strip, said apparatus comprising means for progressively flexing said channel strip longitudinally in a manner to cause its channel to open, means for progressively compressing said channel strip longitudinally relatively to the covering strip, and means for progressively applying a covering strip to said channel strip while the latter is so opened and relatively compressed.

19. In apparatus for applying a covering strip to a channel strip, the combination of a roller, means for so guiding a flexible channel strip as to cause it to pass partly around said roller with its back against the latter, driving means for said channel strip, and means for guiding a covering strip into contact with the longitudinally convex surface of said channel strip as it passes about said roller.

20. In apparatus for applying a covering strip to a channel strip, the combination of a roller, means for so guiding a flexible channel strip as to cause it to pass partly around said roller with its back against the latter, and means for initiating the opening of said channel strip, before it passes onto said roller.

21. In apparatus for applying a covering strip to a channel strip, the combination of channel-opening means including a roller, means for so guiding a flexible channel strip as to cause it to pass partly around said roller with its back against the latter, and cover-strip feeding and pressing means adapted to receive said channel strip from said roller and progressively apply a covering strip thereto.

22. In apparatus for applying a covering strip to a channel strip, the combination of a roller, means for so guiding a flexible channel strip as to cause it to pass partly around said roller with its back against the latter, a roller adapted to press a covering strip against the longitudinally convex surface of said channel strip adjacent the first said roller, and a driven roller adapted to press said channel strip against the first said roller before it reaches its point of contact with said covering strip.

23. In apparatus for applying a covering strip to a channel strip, the combination of a roller, means for so guiding a flexible channel strip as to cause it to pass partly around said roller with its back against the latter, a roller adapted to press the middle portion only of a covering strip against the floor of said channel strip at a station adjacent said first roller, and guiding and stretching means for said covering strip adapted to flex the latter transversely so as initially to present only its middle portion to the channel strip.

24. In apparatus for applying a covering strip to a channel strip, the combination of a pair of rollers adapted to press the work, means for progressively opening a channel strip and guiding it between said rollers, means for guiding a covering strip longitudinally onto said channel strip between said rollers, a drive roller for said channel strip positioned on the work-receiving side of said pair of rollers, and means for driving said drive roller at such peripheral speed as to avoid excessive stretch of said channel strip as the covering strip is applied thereto.

25. In apparatus for applying a covering to strip materials, the combination of a series of rollers adapted progressively to apply a covering strip longitudinally to said strip material and wrap it laterally about the latter, one or more of said rollers being driven, a drive roller for said strip material positioned on the work-receiving side of said series of rollers, and means for driving said drive roller at a greater peripheral speed than that of the driven rollers of said series.

26. In apparatus for applying a covering strip to a channel strip, the combination of a series of rollers formed with outer peripheral portions adapted to fit within the channel of said channel strip, means for progressively opening the channel of said strip and applying a covering strip to its channel as it passes to said series of rollers, rollers adapted to coact with the rollers of said series to fold said covering strip laterally about said channel strip, and means for driving one or more of the rollers mentioned, to feed the work.

27. In apparatus for applying a covering strip to a channel strip, the combination of an aligned series of shoes adapted to fit within the channel of said channel strip and guide the latter, a series of rollers alternating with said shoes and formed with peripheral portions adapted to fit within said channel, means for driving one or more of said rollers to propel the work, means for progressively opening the channel of said channel strip and applying a covering strip thereto as said channel strip passes to said shoes and rollers, and rollers adapted to coact with the rollers of said series to fold said covering strip laterally about said channel strip.

28. In apparatus for lining a channel strip, the combination of means for supporting said strip in working position, means for feeding a flexible lining strip in trough form to the channel of said channel strip, and means for pressing said strips together.

29. In apparatus for lining a flexible rubber channel strip, the combination of means for progressively introducing a lining strip in trough form into the channel strip, means for progressively pressing the strips together first at the bottom of the channel, and means for thereafter progressively pressing said lining strip and the sides of the channel together.

30. The method of lining a flexible rubber channel strip which comprises progressively introducing a lining strip in trough form into the channel of the channel strip, and adhesively uniting the two strips.

31. The method of lining a flexible rubber channel strip which comprises progressively introducing a lining strip in trough form into the channel of the channel strip, progressively sticking them together first at the bottom of the channel, and then progressively sticking them together at the sides of the channel.

In witness whereof we have hereunto set our hands this 3 day of July, 1922.

ROBERT R. AMBLER.
PAUL R. ROHRBACHER.